Patented Aug. 13, 1946

2,405,830

UNITED STATES PATENT OFFICE 2,405,830

PROCESS OF RECOVERING PEANUT PROTEIN

George W. Irving, Jr., Arthur L. Merrifield, Raymond S. Burnett, and Edwin D. Parker, New Orleans, La., assignors to the United States of America, as represented by Claude R. Wickard, Secretary of Agriculture, and his successors in office No Drawing. Application July 19, 1944,
Serial No. 545,652

1 Claim. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to protein fractions, and in partcular to the production of different protein fractions from peanut meal by adjusting the pH of an aqueous extract of proteins obtained from substantially oil-free peanut meal to specific values in succession and removing the protein fractions thus precipitated at each pH value. The invention has among its objects the obtaining of protein fractions having widely different physical and chemical characteristics, and in particular to obtaining of a protein of light color irrespective of the fact that the protein meal used includes the testa, and such other objects as will be made apparent from the following description and claim.

Peanut meal is the material remaining after the substantial portion of oil has been extracted from the peanut kernel and accompanying skin or testa. It usually contains approximately 8 percent moisture and 50 percent protein. The peanut protein contained in the meal consists of several components two of which are presumably globulins, which together comprise approximately 90 percent of the total protein.

It is known that the total protein of peanut meal can be extracted by means of alkaline aqueous solutions, and that practically all of the extracted protein can be precipitated by adding acid to the extract until the pH of the resulting suspension is approximately 4.5, the minimum solubility point of the major protein constituents. The protein thus obtained can be modified by suitable subsequent treatment for use in the production of adhesives, sizes, paper coatings, cold water paints, films, fibers, and so forth.

For each of the above-named uses, a protein preparation of different characteristics is required. In certain adhesives, for example, the protein mixture must possess tack, strong adhesive properties and sufficient water resistance to insure an acceptable wet strength, whereas in the production of fibers, the protein must be capable of forming solutions of sufficient viscosity and clarity to be extruded through the small openings of a spinnerette and be precipitated immediately to yield separate filaments which do not cohere and which have high tensile strength, flexibility and water resistance. For these reasons, the whole protein, as it is prepared from peanut meal by the methods used heretofore, must be treated subsequent to its isolation to modify it in such a manner as to produce in the protein the physical and chemical characteristics desired for each specific application or use.

According to the present invention, however, peanut protein fractions as isolated are produced which have inherent physical and chemical properties which make possible their direct utilization in the production of specific products without further modification or treatment.

In practicing the process in general, the protein is first extracted from peanut meal by means of water to which sufficient sodium hydroxide or other alkali is added to give a pH value in the resulting suspension of approximately 7.0. This pH value may be varied somewhat, since equally good yields can be obtained over the range of 6.8 to 7.2. However, less color from the testa is extracted at values of 7.0 or below, and consequently suspensions having values of 7.0 or slightly lower are preferred. The clear, protein-containing aqueous extract may then be separated from the insoluble residue by centrifuging or filtering and the extracted residue similarly re-extracted successive times to remove remaining protein. In this manner, efficient removal of the protein can be accomplished using a meal to solvent ratio as low as 1:3 in the original extraction and in each of the subsequent washes. More dilute suspensions (meal to solvent ratios of 1:5 or 1:10) can be employed with equal or even greater efficiency of extraction, but since more satisfactory fractionation of the protein, as subsequently described, can be accomplished in more concentrated solutions, a meal to solvent ratio of 1:3 is preferred for the preliminary extractions.

To fractionate and remove the proteins from the aqueous extract, the combined protein extracts (pH 7.0) are next acidified to adjust the pH to a value of 5.9 to 6.1. The acid used may be any soluble mineral or organic acid such as $HCl$, $H_2SO_4$, $H_2SO_3$, $H_3PO_4$, acetic acid, carbonic acid, lactic acid, and so forth. The pH value (5.9 to 6.1) for precipitation of the desired protein should be accurately determined and should not deviate from the limits stated if the highest yield of protein is to be obtained and its characteristics are to be preserved. The precipitated protein is then allowed to settle, preferably in the cold, the turbid supernatant fluid is decanted, and the protein is collected. This protein forms a semi-fluid, plastic, coherent mass on the bottom of a glass container from which it can be poured readily since it exhibits no tendency to adhere to the glass surface. It is white in color and can be pulled manually into fine threads, filaments or ribbons which exhibit a marked gloss and sheen. It can be dried in air at room temperature, in an air oven at temperatures not in excess of 50° C., in a vacuum oven at temperatures which do not exceed 50° C., or by washing with alcohol, to yield a white, stable powder. The addition of suitable amounts of water to this powder reconstitutes the semi-fluid, plastic mass described above. Hereinafter, this protein will be designated "protein 6."

After the removal of protein 6, the remaining supernatant extract is further acidified to adjust the pH to a value of 4.5 by means of any of the acids previously indicated, and the thus precipitated protein, hereinafter designated as "protein 4.5," is removed by filtration or by centrifuging. It precipitates as a granular, white solid. The particles are discrete and non-coherent, and show no tendency to form a plastic mass similar to that found in the case of protein 6. It can be readily dried by any of the means indicated for protein 6 to yield a white powder. Upon addition of suitable amounts of water, the powder resuspends to give a fine suspension of protein which settles rapidly and in the presence of an excess of water exhibits no tendency to form a plastic mass as was obtained upon the addition of water to dried protein 6.

The solution remaining after the removal of protein 6 and protein 4.5 contains only a trace of protein and can be discarded.

By way of further explanation, it may be stated that the total protein of peanut meal is substantially completely soluble and extractable at a pH of 7.0, and that it consists of two major protein components principally contained in the protein 6 and protein 4.5, heretofore mentioned. At a pH of 6.0, the solubility of the total protein is considerably less than its solubility at pH 7.0. In addition, the solubility of one of the major protein components at the pH of 6.0 is greater than the solubility of the other major protein component, and therefore the protein precipitated at a pH of 6.0 is composed predominantly of the less soluble protein component. The protein remaining in solution after the removal of protein 6, consisting predominantly of the more soluble protein component, can then be precipitated completely only at the pH of 4.5.

As the pH value is lowered from 6 to 4.5, the amount of the protein 4.5 precipitated is increased. Therefore, by adjusting the pH to intermediate values and by removing successively the protein precipitated at each value, protein preparations having different properties from those described can be obtained, inasmuch as the relative amounts of the major protein components present in each precipitated fraction will differ.

Protein 6 and protein 4.5 can be obtained in yields of approximately 30 percent and 15 percent by weight from peanut meal, respectively. Dry, ash-free proteins thus obtained contain, respectively, approximately 17.4 percent and 15.2 percent nitrogen.

Having thus described the invention, what is claimed is:

A process of producing a white peanut meal protein comprising forming a suspension in water of a peanut meal and accompanying testa which remain after extraction of the oil from the peanut kernel, adjusting the suspension to a pH value of 6.8 to 7.2, separating the protein-containing aqueous extract from the insoluble residue, adjusting the pH of the aqueous extract to a value of 5.9 to 6.1 to precipitate the desired protein, and collecting the protein thus precipitated.

GEORGE W. IRVING, Jr.
ARTHUR L. MERRIFIELD.
RAYMOND S. BURNETT.
EDWIN D. PARKER.